US012561467B2

(12) United States Patent  
Santos et al.

(10) Patent No.: US 12,561,467 B2  
(45) Date of Patent: Feb. 24, 2026

---

(54) EXTENSION OF FUNCTIONALITY TO FILE SYSTEMS IN CONTAINER ORCHESTRATION SYSTEMS

(71) Applicant: THALES DIS CPL USA, INC., Austin, TX (US)

(72) Inventors: José R. Santos, Pflugerville, TX (US); Partha Sarathi Besagarahalli Lakshmaiah, San Ramon, CA (US); Steven Pratt, Leander, TX (US); Mahesh Mohan, Pune (IN)

(73) Assignee: THALES DIS CPL USA, INC., Austin, TX (US)

( * ) Notice: Subject to any disclaimer, the term of this patent is extended or adjusted under 35 U.S.C. 154(b) by 0 days.

(21) Appl. No.: 18/690,347

(22) PCT Filed: Aug. 29, 2022

(86) PCT No.: PCT/US2022/041789  
§ 371 (c)(1),  
(2) Date: Mar. 8, 2024

(87) PCT Pub. No.: WO2023/038817  
PCT Pub. Date: Mar. 16, 2023

(65) Prior Publication Data  
US 2024/0370581 A1　Nov. 7, 2024

Related U.S. Application Data

(60) Provisional application No. 63/241,623, filed on Sep. 8, 2021.

(51) Int. Cl.  
*G06F 21/62* (2013.01)  
*G06F 9/445* (2018.01)  
*G06F 21/60* (2013.01)

(52) U.S. Cl.  
CPC ........ *G06F 21/6218* (2013.01); *G06F 21/604* (2013.01)

(58) Field of Classification Search  
CPC ........................... G06F 21/6218; G06F 21/604  
(Continued)

(56) References Cited

U.S. PATENT DOCUMENTS 10,873,592 B1 * 12/2020 Singh .................. H04L 63/1425  
11,188,571 B1 * 11/2021 Chen .................. G06F 16/2246  
(Continued)

OTHER PUBLICATIONS

Amit Warke;Storage Service Orchestration with Container Elasticity; IEEE:2018; pp. 283-292.*  
(Continued)

*Primary Examiner* — Monjur Rahim

(57) ABSTRACT

Extension of functional capabilities of a file system in a container orchestration system by associating an extended storage class with a functional extension wherein access to data storage volumes belonging to the extended storage class are handled by an extended file system. In response to deployment of an application pod config including definition of an extended volume belonging to the extended storage class, request mounting the extended volume and creating a staging pod for mounting the original data storage volume and causing the container orchestration system to deploy the staging pod. Access by the containers in the application pod to data stored in the extended volume is handled by the extended file system.

22 Claims, 9 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 11,201,955 | B1 * | 12/2021 | Sachdeva | H04L 43/20 |
| 11,256,759 | B1 * | 2/2022 | Chen | G06F 16/9027 |
| 11,314,687 | B2 * | 4/2022 | Kavaipatti Anantharamakrishnan | G06F 16/128 |
| 11,360,844 | B1 * | 6/2022 | Dodsley | G06F 11/1438 |
| 11,467,775 | B2 * | 10/2022 | Cain | G06F 3/0659 |
| 11,474,873 | B2 * | 10/2022 | Biernat | G06F 9/5072 |
| 11,513,877 | B2 * | 11/2022 | Biernat | G06F 9/45558 |
| 11,693,573 | B2 * | 7/2023 | Cain | G06F 3/0685 714/19 |
| 11,861,221 | B1 * | 1/2024 | Richardson | G06F 3/0647 |
| 11,921,670 | B1 * | 3/2024 | Emberson | G06F 16/125 |
| 12,066,804 | B2 * | 8/2024 | Biernat | G05B 19/41865 |
| 12,135,885 | B2 * | 11/2024 | Cain | G06F 3/0664 |
| 12,282,566 | B2 * | 4/2025 | Speks | G06F 21/6218 |
| 2017/0249472 | A1 | 8/2017 | Levy et al. | |
| 2018/0129666 | A1 | 5/2018 | Hawevala | |
| 2019/0356736 | A1 * | 11/2019 | Narayanaswamy | G06F 13/4282 |
| 2020/0112487 | A1 * | 4/2020 | Inamdar | H04L 67/14 |
| 2020/0364189 | A1 * | 11/2020 | Lee | G06F 21/64 |
| 2021/0103392 | A1 * | 4/2021 | Murray | G06F 3/0689 |
| 2021/0103395 | A1 * | 4/2021 | Yankovskiy | G06F 3/0604 |
| 2021/0120039 | A1 * | 4/2021 | Bett | G06F 11/1461 |
| 2021/0240369 | A1 * | 8/2021 | Cain | G06F 3/0679 |
| 2021/0311764 | A1 * | 10/2021 | Rosoff | G06F 9/44505 |
| 2021/0318824 | A1 * | 10/2021 | Cain | G06F 3/0604 |
| 2021/0397356 | A1 * | 12/2021 | Cain | G06F 3/065 |
| 2022/0012373 | A1 * | 1/2022 | Kulkarni | G06F 21/602 |
| 2022/0035574 | A1 * | 2/2022 | Cain | G06F 3/0613 |
| 2022/0188028 | A1 * | 6/2022 | Mesnier | G06F 3/0659 |
| 2022/0222098 | A1 * | 7/2022 | Srivastava | G06F 9/45558 |
| 2022/0222099 | A1 * | 7/2022 | Srivastava | G06F 9/45545 |
| 2022/0222100 | A1 * | 7/2022 | Srivastava | G06F 9/5077 |
| 2022/0239503 | A1 * | 7/2022 | Mallikarjuna Durga Lokanath | H04L 9/0891 |

OTHER PUBLICATIONS

International Search Report (PCT/ISA/210) and Written Opinion (PCT/ISA/237) mailed on Nov. 29, 2022, by the European Patent Office as the International Searching Authority for current International Application No. PCT/US2022/041789—[17 pages].
Helmbrecht Detlef et al: "Using the IBM Block Storage CSJ: Driver in a Red Hat OpenShift Environment", May 1, 2021 (May 1, 2021), XP055979577, Retrieved from the Internet: URL:https://www.redbooks.ibm.com/redpapers /pdfs/redp5613.pdf; [retrieved on Nov. 9, 2022]; pp. .1-43; pp. •113-125.

* cited by examiner

EXTENSION OF FUNCTIONALITY TO FILE SYSTEMS IN CONTAINER ORCHESTRATION SYSTEMS

BACKGROUND OF THE INVENTION

The present invention relates, generally, to container orchestration systems, and, more particularly, to extending the functionality of filesystems in container-orchestration systems without requiring modification to the container-orchestration runtime environments.

Container orchestration systems automate deployment, maintenance, and scaling of distributed applications by managing containerized workloads and services, that facilitates both declarative configuration and automation. In containerized systems, a kernel allows for multiple isolated user space instances that are sometimes referred to as containers, for example, used with the popular container orchestration system Kubernetes, which is described at https://kubernetes.io, which is incorporated herein by reference. There are also many reference texts, for example, B. Burns, J. Beda, and K. Hightower, *Kubernetes Up & Running,* O'Reilly (2019), is incorporated herein by reference.

However, container-orchestration systems, such as Kubernetes, are restrictive in extensions that upset the state of an application deployment. For example, Kubernetes does not support filesystem layering and, therefore, does not provide a mechanism to add third-party filesystem protections such as encryption and access control policies to applications deployed through container-orchestration systems.

From the foregoing it is apparent that there is a need for an improved method for providing post-publication extensions to applications deployed through container-orchestration systems, including providing for filesystem layering in container-orchestration systems and, thereby, providing a mechanism for providing filesystem protections such as encryption and access control policies to applications deployed through container-orchestration systems.

SUMMARY

Providing extension to filesystem functionality in container orchestration systems has proven challenging. Container orchestration systems, e.g., Kubernetes, operate as state machines. This paradigm restricts modifications that may be added post-publication of containerized applications. As a result, it is desirable to provide a mechanism by which extensions in functionality of container-orchestration file systems may be achieved while still operating within the paradigm of operating the container-orchestration as a state machine.

An embodiment of the invention extends capabilities of a filesystem in a container orchestration system, such as Kubernetes, without making changes to the run-time environment of the container orchestration system, wherein a filesystem extension provides a function not otherwise provided by the filesystem of the container orchestration system. This extension in functionality is achieved by associating an extended storage class with an extension, whereby access to data storage volumes belonging to the extended storage class are handled by an extended filesystem; associating an original volume with a storage class other than the extended storage class; in response to deployment of an application pod configured to include a definition of an extended volume belonging to the extended storage class: request mounting the extended volume; creating, by the extended filesystem, a staging pod for mounting the original data storage volume and causing the container orchestration system to deploy the staging pod; mounting, by the staging pod, the original data storage volume;
determining a path locating the mount of the original data storage volume; using the path locating the mount of the original data storage volume, mounting the extended volume using the original data storage volume as data source, wherein the extended volume belongs to the extended storage class; publishing the mount of the extended volume to containers of the application pod; and placing the application pod in a running phase, wherein access by the containers in the application pod to data stored in the extended volume is handled by the extended filesystem.

In an aspect of the invention, the extension of capabilities of a filesystem in a container orchestration system are the extended capabilities is filesystem layering; in another aspect, the extended capabilities is overlaying a first volume over a second volume to provide a cohesive volume comprising the first volume and the second volume.

In an aspect of the invention, the original volume is created as a persistent volume and a corresponding persistent volume claim. In an alternative, the original volume as an ephemeral volume and a corresponding ephemeral volume claim.

In an aspect of the invention, the extended volume is created as a persistent volume and a corresponding persistent volume claim. In an alternative, the extended volume is an ephemeral volume and a corresponding ephemeral volume claim.

In an aspect of the invention, the extended volume is accessed by an application container; and that access is marshalled by the driver associated with the extended storage class, wherein, the driver associated with the extended storage class provides, for example, cryptographic services on data stored in the extended volume or enforces access control policies with respect to data stored in the extended volume.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
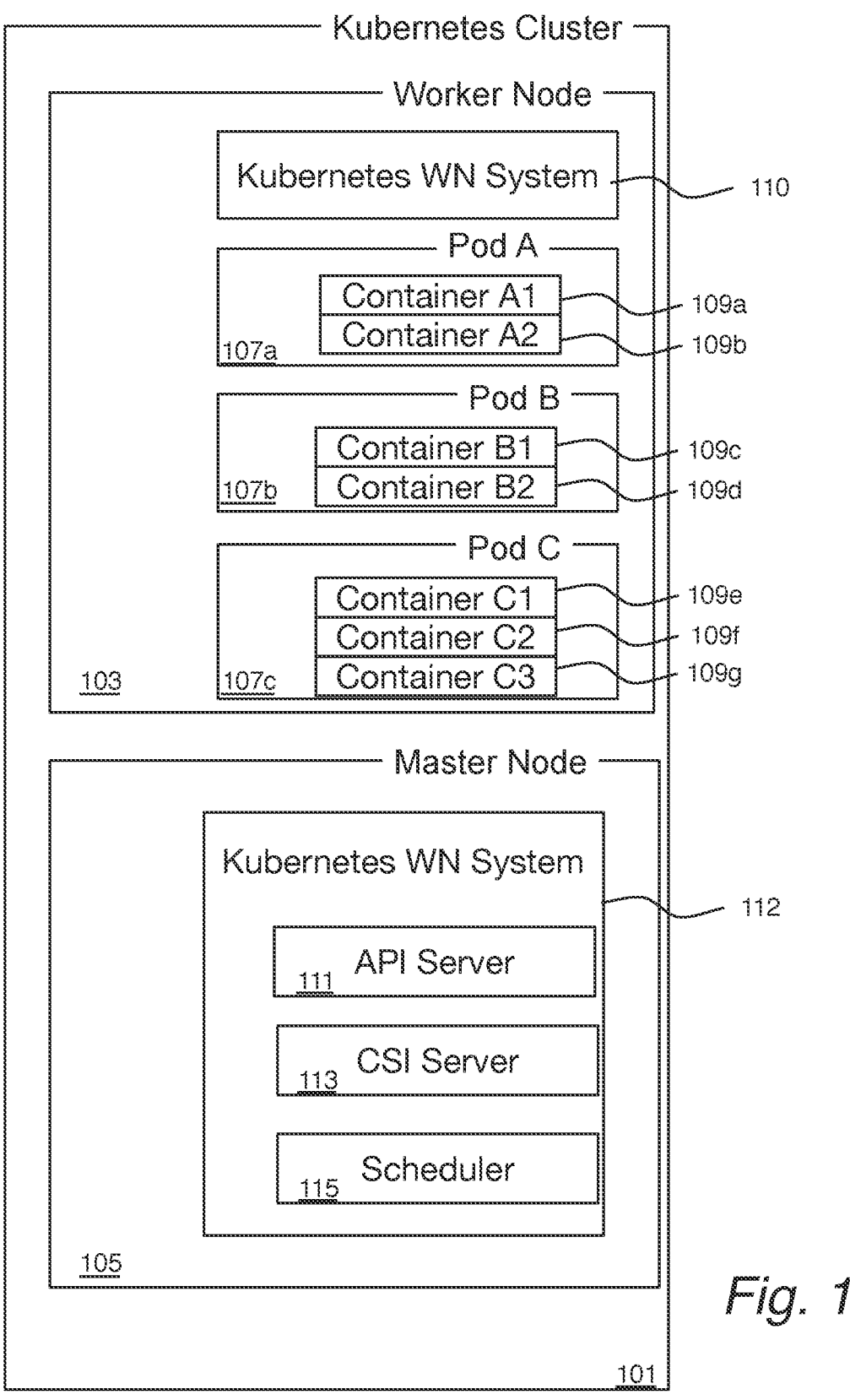
FIG. 1 is a block diagram of a cluster managed using a container orchestration system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules and that such software instructions and modules are stored in an instruction memory.

The herein-described technology provides a mechanism for providing post-publication extensions to applications deployed through container-orchestration systems, including providing for filesystem layering to container-orchestration systems and, thereby, allows for addition of filesystem encryption and access control policies to applications deployed through container-orchestration systems without requiring any modifications to the applications themselves. These filesystem extensions are provided to containerized applications without requiring modifications to the runtime environment provided by the container orchestration system.

Definitions

A cluster is a collection of related machines that are collectively managed by a cluster administrator. The cluster administrator may, for example, manage a cluster through a command-line tool; in the example of Kubernetes, known as kubectl.

The machines that make up a cluster are referred to as nodes. Nodes may be either virtual machines or physical machines. However, as virtual machines ultimately execute on one or more physical machines, any improvement to the functioning of a cluster of nodes is an improvement on the functioning of a physical machine.

Two types of nodes reside in a cluster; at least on worker node and a master node. Containerized applications are located on a worker node. Kubernetes services are typically hosted on the master node.

A container, i.e., the environment on which containerized applications execute provide a defined set of resources available to any containerized applications executing in a given container. A container contains all the definitions that a containerized application needs to execute, i.e., runtime, libraries, storage definitions. Thus, a developer of a containerized application can expect that the containerized application will execute correctly wherever it is executed because the container definition remains the same regardless of on which machines it is deployed.

Kubernetes executes applications by placing containers in pods. Pods are the smallest deployable units in Kubernetes. Thus, even if a pod contains only one container, that container is located in a pod, i.e., the pod provides a shell around the container. A pod definition, or pod config (pod configuration file), declares storage requirements for the pod.

FIG. 1 illustrates by way of example a few of the above concepts. A cluster 101 consists, in this case, of a worker node 103 and a master node 105. The worker node 103 contains three pods 107a through 107c. These, in turn, contain containers 109a through 109g, respectively.

The Kubernetes system functionality is provided through services located in the worker node 103 as well as in the master node 105. Thus, the worker node 103 includes a pod referred to as the Kubernetes Worker Node (WN) System 110. Similarly, the master node 105 contains a pod referred to as the Kubernetes Master Node (MN) System 112. Details of these relevant to the present disclosure is described hereinbelow.

The master node 105, which provides services to the applications executing in the worker node 103 contains several components including Kubernetes system services located in the Kubernetes Master Node System 112. These include application interface server (API) 111 through which applications in the worker node 103 communicate with the cluster. Furthermore, the API server 111 services commands entered on the command-line tool kubectl.

The master node 105, e.g., in the Kubernetes Master Node System 112, also contains a container storage interface (CSI) server 113. The role of the CSI Server 113 is to manage third-party storage plugins used by containerized applications. These functions are described in greater detail below.

The master node 105, e.g., in the Kubernetes Master Node System 112 also contains a scheduler 115. The scheduler 115 assigns pods to particular nodes in the cluster depending on the requirements of the various pods that are execute on the cluster 101 and the capabilities of the nodes, e.g., in terms of storage available on any given node.

A master node 105 contains additional components. However, those components are not necessary for this discussion.

Kubernetes is a state machine in the sense that it tries to move pods to a desired state. A pod lifecycle consists of several phases: pending, running, succeeded, and failed. Kubernetes attempts to move a pod from pending to one of the termination phases, succeeded or failed. Of course, for many pods running may be the phase that a pod is expected to remain unless deliberately shut down or is terminated due to an error condition of some sort. Generally, Kubernetes attempts to restart pods that are terminated due to error, thus, moving the cluster towards a desired state.

In the pending phase a pod has been accepted into the Kubernetes cluster. However, at least one container still requires some form of set up, for example, including allocation of storage.

In the running phase, a pod has been assigned to a node and all containers of the pod have been created. At least one container is executing or is being started.

A pod is in the succeeded phase once all containers in the pod have successfully terminated without errors. Pods in the succeeded phase will not be restarted. Conversely, the pod is in failed phase if all containers of the pod have terminated and at least one pod terminated in failure. Depending on the pod definition, the pod maybe automatically restarted if in failed phase.

Where pods exist in one of various phases, containers are each associated with a state. These include waiting, running, and terminated. A container in waiting state is running operations required to complete startup. A running container is a container that is executing. A completed or failed container is in the terminated state.

Storage in Kubernetes can be either ephemeral or persistent. Ephemeral storage expires when no pod is running that makes use of the storage. However, persistent storage does not expire when a pod using it terminates.

Figure 2:
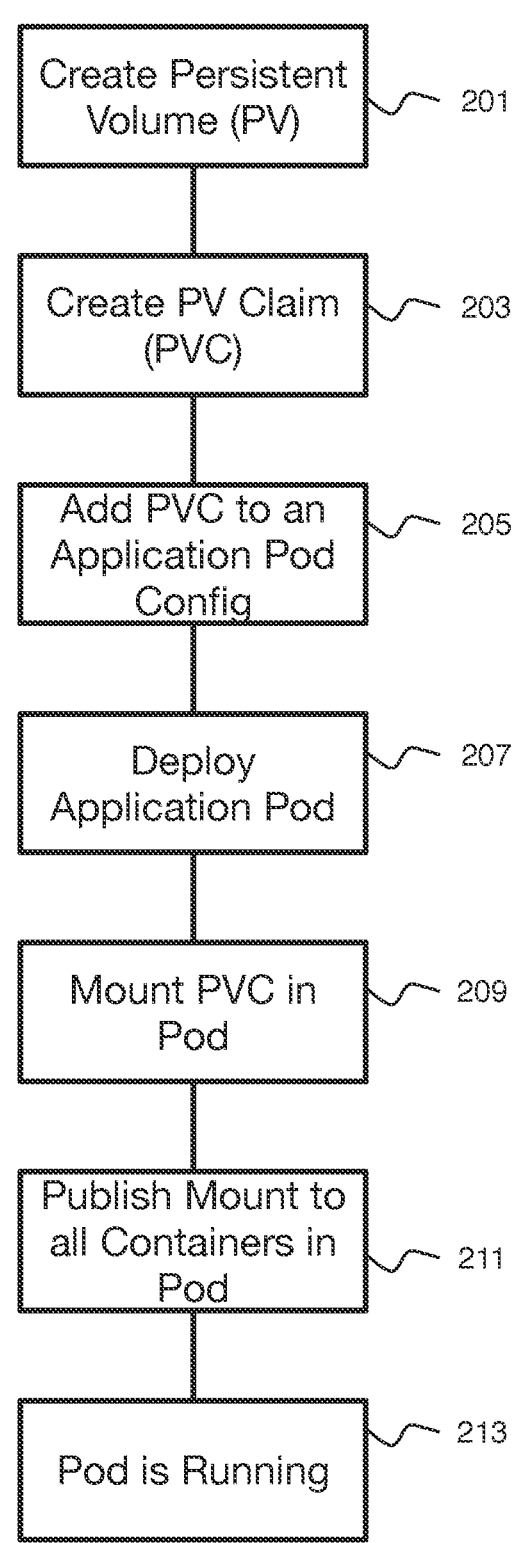
FIG. 2 is a flow diagram illustrating a typical flow of a Kubernetes cluster with respect to the creation and consumption of storage, specifically persistent storage.

FIG. 2 illustrates a typical flow of a Kubernetes cluster with respect to the creation and consumption of storage, specifically persistent storage. While the examples discussed herein use persistent volumes, it should be noted that the techniques described are applicable to ephemeral volumes as well.

A first step is for a cluster administrator to create a persistent volume, for example, through the command-line tool kubectl, step 201. Table 1 is an example YAML file (YAML is an recursive acronym: YAML Ain't a Markup Langage) (nfs-pv.yaml) for the creation of a persistent volume.

TABLE 1

| | nfs-pv.yaml |
|---|---|
| 1 | apiVersion: v1 |
| 2 | kind: PersistentVolume |
| 3 | metadata: |
| 4 | name: nfs-francisco |
| 5 | spec: |
| 6 | capacity: |
| 7 | storage: 5Gi |
| 8 | accessModes: |
| 9 | - ReadWriteMany |
| 10 | storageClassName: nfs |
| 11 | mountOptions: |
| 12 | - hard |
| 13 | - nfsvers=3.0 |
| 14 | nfs: |
| 15 | path: /home/francisco |
| 16 | server: 10.10.10.10 |
| 17 | persistentVolumeReclaimPolicy: Retain |

The file nfs-pv.yaml creates a new persistent volume (Line 2) named nfs-francisco (Line 4). It is a network files storage (nfs) volume (defined by the storageClassName, Line 10) with a storage capacity of 5Gi (Line 7). The persistent volume creation specifies the location of the volume; in this case on a server named 10.10.10.10 (Line 16) and with a path there on of /home/francisco (Line 15).

To make use of a persistent volume a namespace manager, for example, claims the persistent volume or a portion thereof, step 203, which may be performed using the command-line tool kubectl. Such a claim is referred to as a persistent volume claim (PVC). Table 2 is an example YAML file for making a persistent volume claim (PVC).

TABLE 2

| | nfs-claim.yaml |
|---|---|
| 1 | apiVersion: v1 |
| 2 | kind: PersistentVolumeClaim |
| 3 | metadata: |
| 4 | name: nfs-test-claim |
| 5 | spec: |
| 6 | storageClassName: nfs |
| 7 | accessModes: |
| 8 | - ReadWriteMany |
| 9 | resources: |

TABLE 2-continued

| | nfs-claim.yaml |
|---|---|
| 10 | requests: |
| 11 | storage: 1Gi |

The nfs-claim.yaml file requests 1 Gi (Line 11) of persistent (Line 2) nfs (Line 6) storage. That persistent volume claim is named nfs-test-claim (Line 4). The scheduler 115 may allocate that persistent volume claim to any persistent volume that can meet the requested storage, for example, the persistent volume created in step 201, i.e., in the example of Table 1, nfs-francisco.

Next a persistent volume claim (PVC) is added to an application pod config, i.e., the configuration file that defines a pod, step 205. The pod config file defines the directory structure for containers within that pod. Table 3 is an example pod config YAML file making use of the PVC nfs-test-claim.

TABLE 3

| | demo-pod.yaml |
|---|---|
| 1 | apiVersion: v1 |
| 2 | kind: Pod |
| 3 | metadata: |
| 4 | name: nfs-demo |
| 5 | spec: |
| 6 | volumes: |
| 7 | - name: test-vol |
| 8 | persistentVolumeClaim: |
| 9 | claimName: nfs-test-claim |
| 10 | containers: |
| 11 | - name: ubuntu |
| 12 | image: ubuntu |
| 13 | volumeMounts: |
| 14 | - mountPath: "/data" |
| 15 | name: test-vol |
| 16 | command: |
| 17 | - "sleep" |
| 18 | - "604800" |
| 19 | imagePullPolicy: IfNotPresent |
| 20 | restartPolicy: Always |

Figure 3:
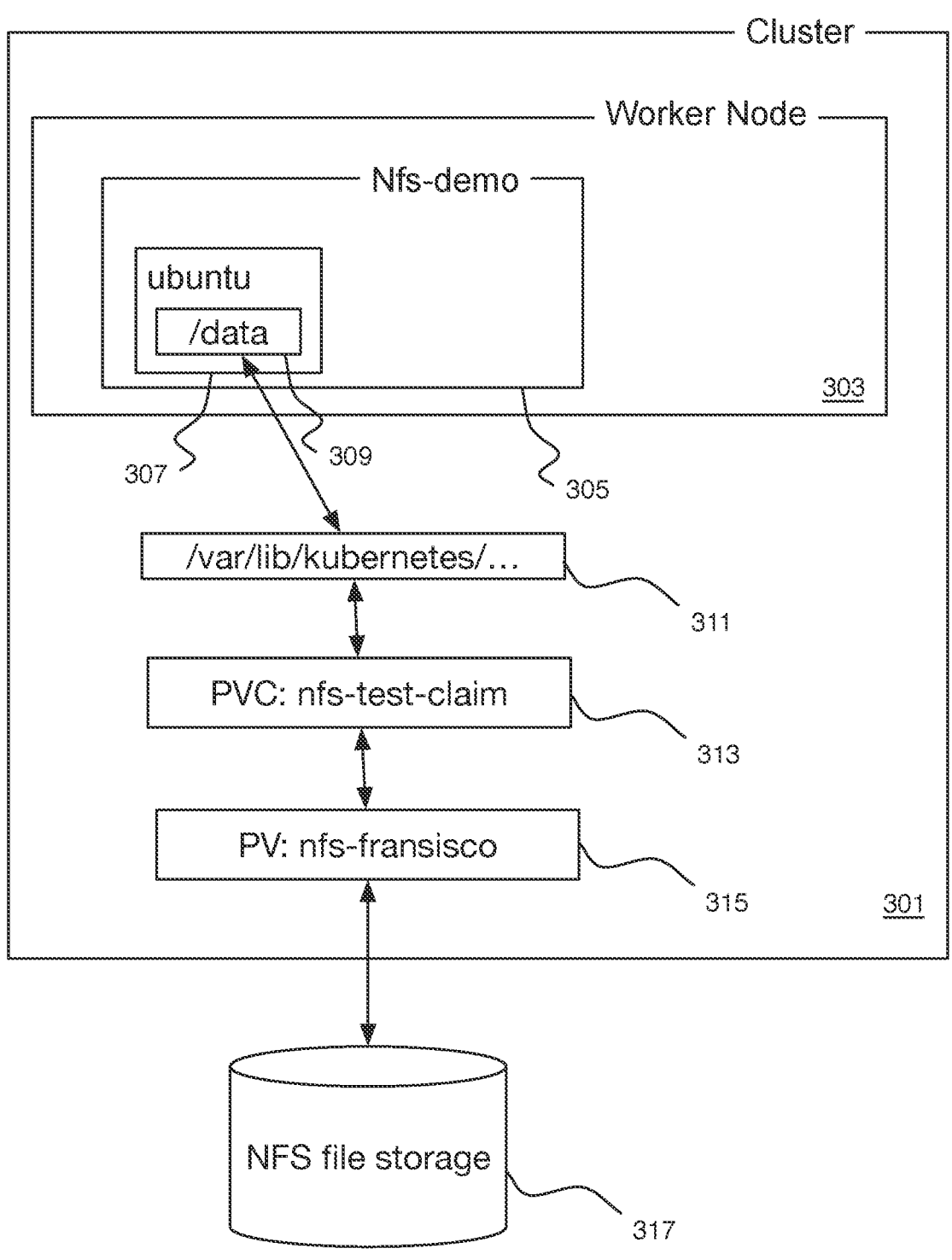
FIG. 3 is a high-level block diagram illustrating an example cluster resulting from the execution of example configuration files.

The file configures a pod called nfs-demo (illustrated in FIG. 3 as the Nfs-demo pod 305). It includes the use of the persistent volume claim nfs-test-claim (Line 9) which in the namespace of the pod is referred to as test-vol (Line 15). It also declares the use of a container called ubuntu (Lines 10-19), which requires the volume test-vol to be mounted (Lines 13-15) onto a mount path referred to as/data (line 14).

Pods within a cluster can, thus, have their own namespaces within the cluster and can therefore divide functional groups of applications within the cluster.

Next the application pod is deployed by the Kubernetes cluster, step 207. Details of the deployment of application pods is beyond this document.

During the startup activities to move a pod from pending to running resources required by the pod are set up. In that process, if Kubernetes finds that the pod has one or more volume claims defined, Kubernetes mounts those volume claims, step 209. The mechanism to mount the persistent volume that corresponds to the volume claim is defined by the driver that supports that volume; e.g., if the persistent volume is a host path, a directory within the host is mounted, whereas, if the persistent volume is a network storage, the persistent volume definition may include many other parameters such as server address and authentication tokens. In other words, how a persistent volume is mounted is an attribute specific to that persistent volume.

Once the persistent volumes are mounted, these mounts are published to all containers in the pod, step 211. Because Kubernetes is a state machine that seeks to maintain a defined state for each pod, once all persistent volumes defined by the pod are published no further persistent volume claims may be added to the pod.

Finally, with all the persistent volumes defined by the pod configuration mounted, the pod moves to the running phase, step 213.

FIG. 3 is a high-level block diagram of illustrating a cluster 301 that may be the result of executing the configuration files of the example of Tables 1, 2, and 3.

A cluster 301 has been created by a cluster administrator, e.g., using the command-line tool kubectl and configured through the configuration files of Tables 1, 2, and 3.

That cluster 301 includes a worker node 303 to which the pod nfs-demo 305 has been instantiated. The pod nfs-demo 305 includes a container ubuntu 307 with a mount/data 309. Of course, the cluster 301 may include more nodes and more pods and the pod 305 may contain additional containers.

The mount 309 points to a Kubernetes internal path representation 311, which in turn links the mount 309 to the persistent volume claim (PVC) 313 nfs-test-claim and thereby to the persistent volume 315 nfs-fransisco, which is ultimately linked to a network file storage 317.

In an embodiment illustrated in FIGS. 4 through 6, the mechanism described hereinabove is extended to allow for additional functionality to the functionality provided by the file system claimed by a deployed and published pod; for example, the added functionality may be filesystem layering to provide functions such as cryptographic services or access control services. Consider a scenario in which an application that is intended to consume data stored on a filesystem requires encryption or access control mechanisms for the filesystem. To do so, embodiments described herein below add a filesystem layer that provides such encryption services or access control mechanisms.

Figure 4:
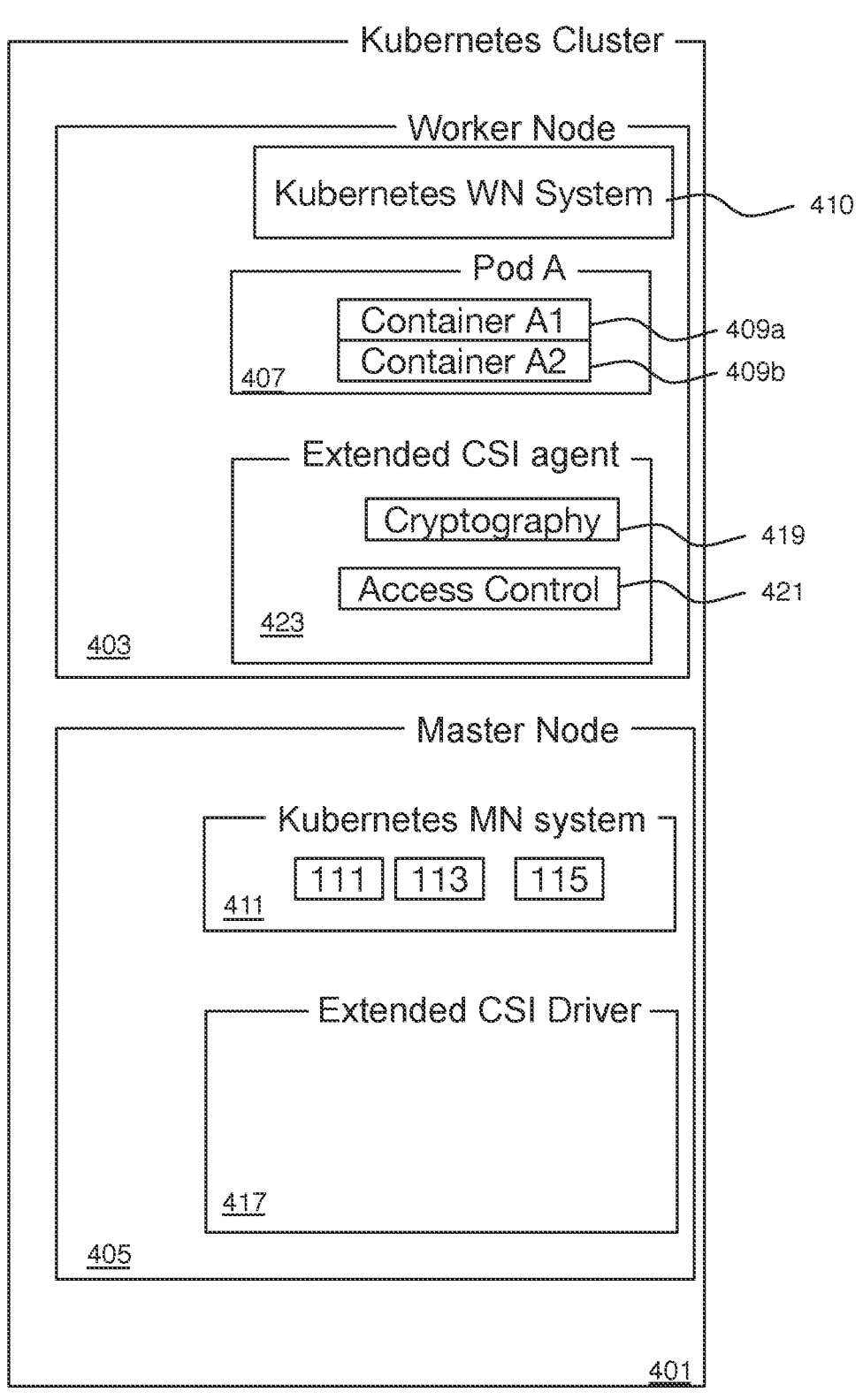
FIG. 4 is a high-level architecture diagram illustrating an embodiment providing support for extension of filesystem functionality in a container orchestration system.

FIG. 4 is a high-level architecture diagram illustrating an embodiment providing support for extension of filesystem functionality, e.g., filesystem layering in Kubernetes and, in particular, for providing file access control mechanisms including cryptographic services to containerized applications deployed in a Kubernetes cluster. While filesystem layering is illustrated in FIG. 4 and described hereinbelow in conjunction with FIG. 4, the techniques may be used to provide other filesystem extensions to a container orchestration system, e.g., file system overlays, in which a plurality of files may be accessed as one.

Normal Kubernetes services, such as API server 111, CSI server 113, and the Scheduler 115 (collectively, Kubernetes master-node (MN) system 411) located in a master node 405, corresponding to master node 105 of FIG. 1, remain unchanged.

The master node 405 further includes an Extended CSI driver 417. As discussed hereinbelow, the Extended CSI driver 417 provisions a persistent volume on which a layered file system is provided to provide, for example, cryptographic services and access control services to data stored thereon.

The worker node 403, corresponding to worker node 103 of FIG. 1, of the cluster 401 contain application pods 407, each with one or more containers 409. While only one application pod 407 is illustrated, it should be appreciated that there is no theoretical limit on the number of pods that may be included in the worker node 403.

The worker node 403 further contains an Extended CSI agent 423 corresponding to the Extended CSI driver 417; these are collectively the extended CSI system. The role of the Extended CSI (EXT CSI) agent 423 is to become aware of an application pod requiring services from the Extended CSI driver 417. Furthermore, the Extended CSI driver 417 may provide cryptography services 419 such as file encryption, decryption, key management, and digital signature. Further, the Extended CSI driver 417 may provide (or may alternatively provide) access control policy services 421.

The worker node 403 further contains the worker-node portion of the Kubernetes system in the Kubernetes Worker Node (WN) System pod 410.

Figure 5A:
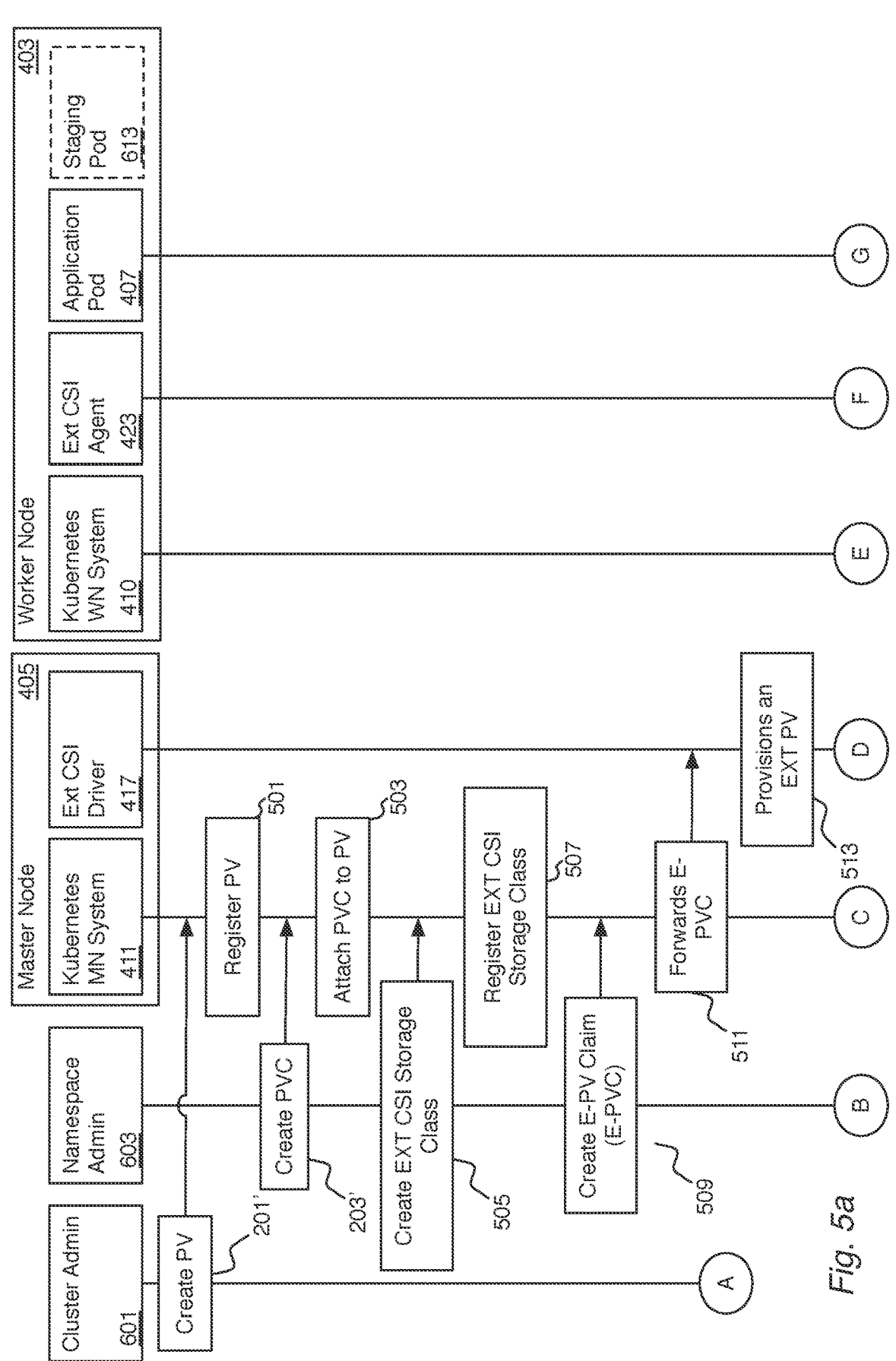
FIG. 5, which consists of FIGS. 5*a*, 5*b*, and 5*c*, is a timing-sequence diagram illustrating process steps for providing the extended functionality to an application pod in a container orchestration system.
Figure 5B:
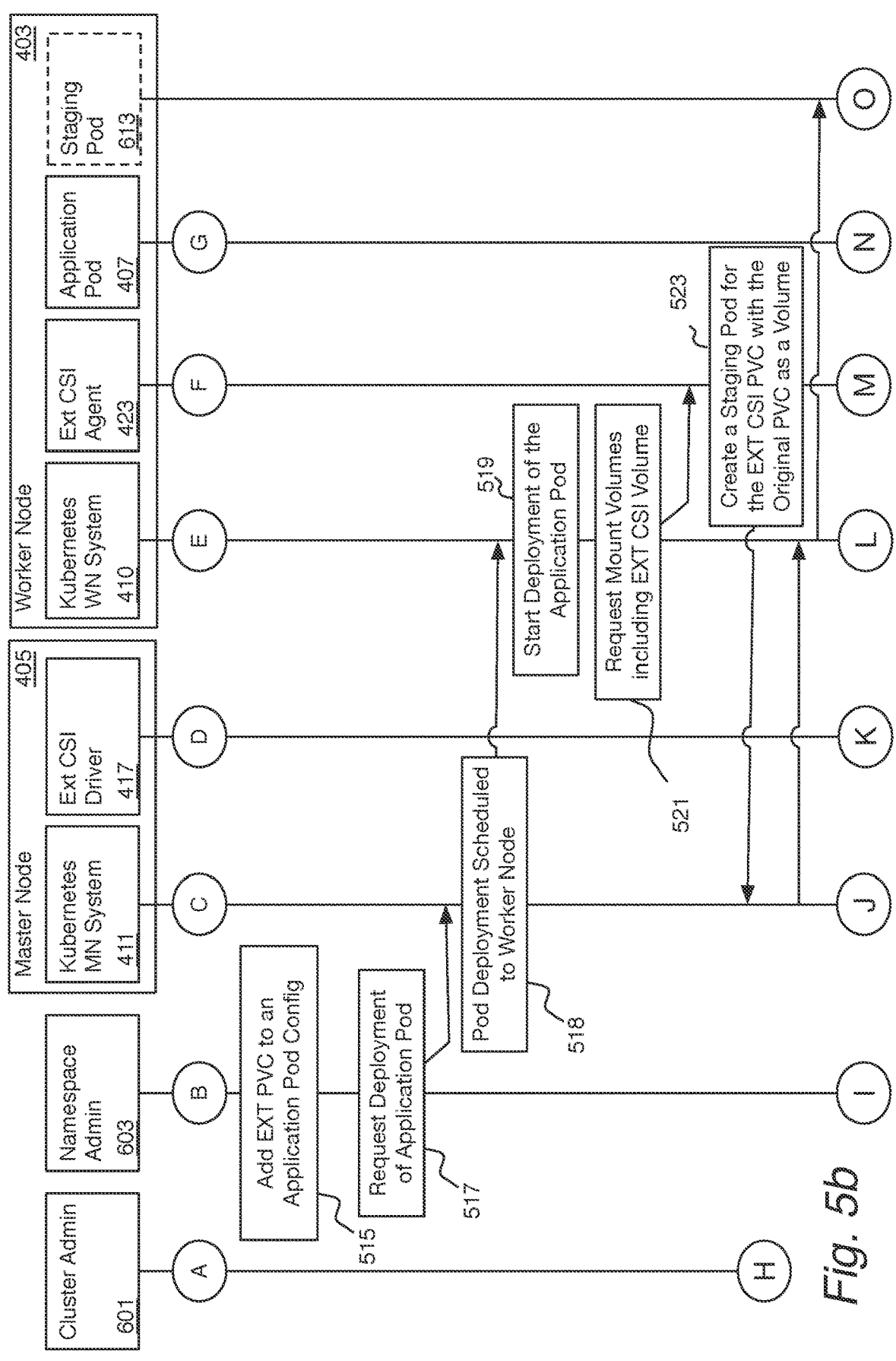
Figure 5C:
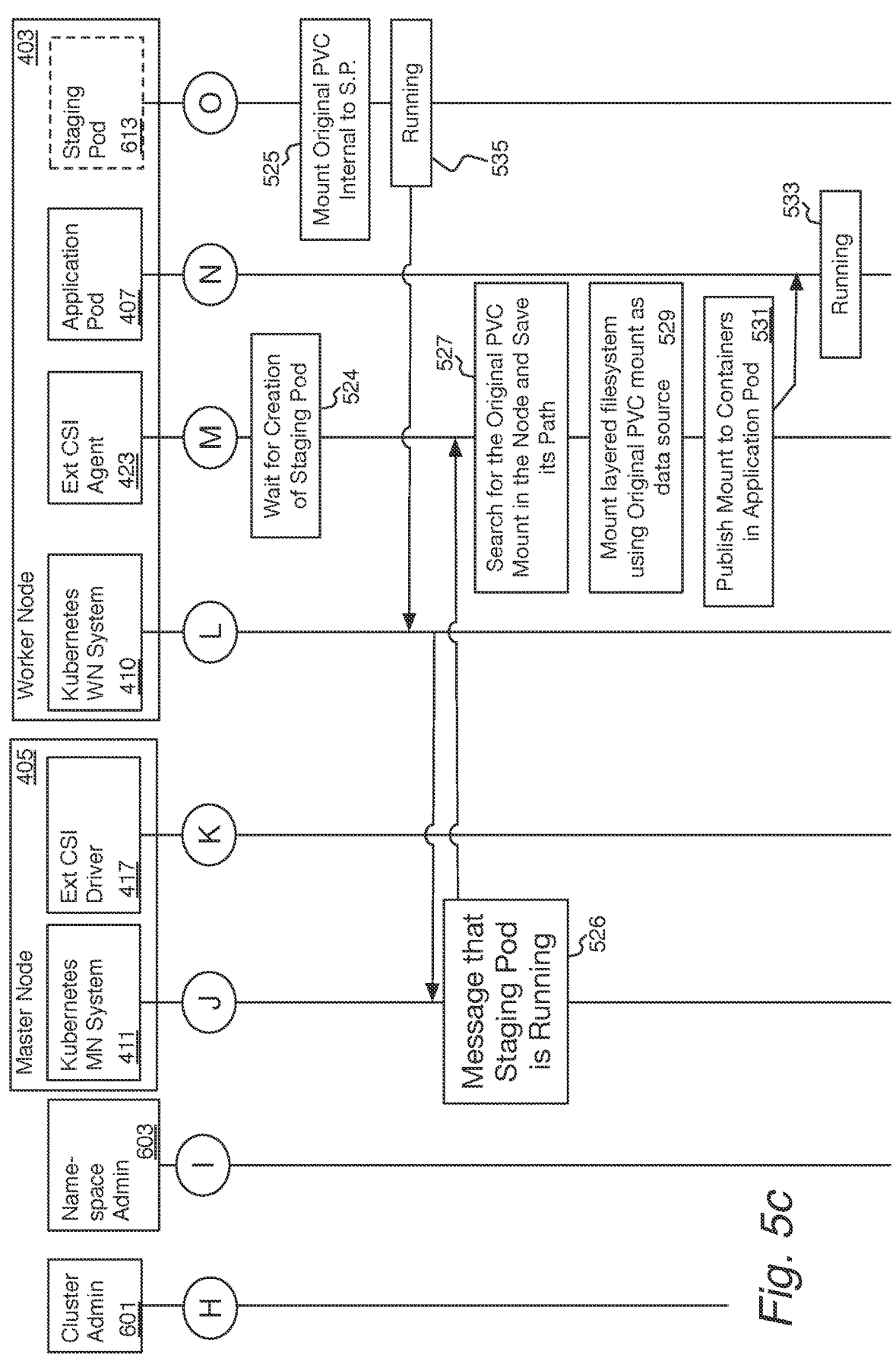

FIG. 5 is a timing-sequence diagram illustrating process steps for providing the extended CSI (EXT CSI) services to an application pod 407. Many of the steps correspond directly to steps in FIG. 2. Those steps are numbered with a reference numeral bearing a single quote, i.e., step 201' of FIG. 5 corresponds to step 201 of FIG. 2.

The first two steps are analogous to those of FIG. 2. Note that the result of step 203', like step 203, is a persistent volume claim of a given name. This persistent volume claim is referenced in later steps and links a filesystem layer to that persistent volume claim. In response to the creation of a PV (step 201') and creation of a PVC (step 203'), the Kubernetes master-node system 411 registers the PV (step 501) and PVC (step 503), respectively.

Hereinbelow, a mechanism is described for adding a filesystem layer on top of the persistent volume claim created in step 201'; that persistent volume claim is referred to as the original persistent volume claim. In one embodiment, the filesystem layer that is added to the original persistent volume claim adds cryptographic services to protect the original persistent volume. In that sense, the original persistent volume may be viewed as an unprotected volume until the filesystem layer protects that unprotected volume, thus, yielding a protected volume.

Typically, step 201' is performed by a cluster administrator 601 using the command-line tool kubectl. Alternatively, persistent volumes are automatically created. Similarly, creation of a PVC in step 203' may be performed by the Namespace Administrator 603 in charge of a particular application pod 407 or in an automated step.

As a preliminary matter, a storage class for a persistent volume corresponding to the extended CSI is defined by the namespace administrator 603, step 505. Table 4 provides example YAML code for declaring a storage class for an extended CSI.

TABLE 4

| | extended-storage.yaml |
|---|---|
| 1 | apiVersion: storage.k8s.io/v1 |
| 2 | kind: StorageClass |
| 3 | metadata: |
| 4 | name: csi-test-sc |
| 5 | provisioner: ext.csi |
| 6 | reclaimPolicy: Retain |
| 7 | volumeBindingMode: Immediate |
| 8 | allowVolumeExpansion: true |
| 9 | parameters: |
| 10 | cmaddr: 192.168.70.1 |
| 11 | test_parameter: this is a test |

The extended-storage.yaml file provides attributes for an extended persistent volume claim including a name for the storage class, in the case of the example of Table 4, csi-test-sc (Line 4). The extended CSI driver 417 and extended CSI agent 423 may support multiple types of storage classes, each with different characteristics.

The extended-storage.yaml file also specifies that the provisioner of the storage class is ext.csi (Line 5), which is a link to the extended CSI driver 417 and extended CSI agent 423. In other words, data access to persistent storage claims having a provisioner that corresponds to the extended CSI driver 417 and extended CSI agent 423 are directed to the extended CSI driver 417 and extended CSI agent 423, collectively, the extended CSI system.

The storage class file also defines some attributes in the parameters associated with the storage class (Lines 9-11). These parameters provided in a storage class are used by volumes that use the storage class to provide those volumes configuration parameters. These configuration parameters can be any number of things like, key manger address, security policy definitions, encryption keys, authentications tokens, etc.

When the Kubernetes MN system 411 receives the declaration of a storage class in which the provisioner is the provider of the extended CSI (EXT CSI), the Kubernetes MN system 411 registers the EXT CSI storage class, step 507.

Next, a namespace administrator 603 makes an extended persistent volume claim (E-PVC) to a previously declared persistent volume claim, step 509. This claim may also be made by executing a YAML file in the command-line tool kubectl. Table 5 is an example YAML file for making an extended persistent volume claim that thereby causes a file-layering provided by the ext csi system to be placed over the filesystem for the persistent volume claim declared in step 203' for the persistent volume defined in step 201'.

TABLE 5

| | ext-csi-claim.yaml |
|---|---|
| 1 | apiVersion: v1 |
| 2 | kind: PersistentVolumeClaim |
| 3 | metadata: |
| 4 | name: extCSI-claim1 |
| 5 | annotations: |
| 6 | extPolicy: policy_1 |
| 7 | spec: |
| 8 | storageClassName: csi-test-sc |
| 9 | accessModes: |
| 10 | - ReadWriteMany |
| 11 | resources: |
| 12 | requests: |
| 13 | storage: 1Gi |
| 14 | dataSource: |
| 15 | kind: PersistentVolumeClaim |
| 16 | name: nfs-test-claim |

This yaml file, which, for example, the name space administrator 603 for the application pod 407 would run via the command-line tool kubectl, makes use of the services of the EXT CSI system, creates a persistent volume claim with the storage class csi-test-sc (Line 8), which was set up as an ext-csi storage class in step 505 and thus, is associated with the EXT CSI system through the provision given in the storage definition for the csi-test-sc storage class. The storageClassName specification with a name corresponding to a name of a storage class whose provisioner (as defined in the storage class declaration (step 501)) places the persistent volume claim under the ambit of the EXT CSI system.

The created persistent volume claim is provided a name (Line 4), in the example, extCSI-claim1, and using an annotation (extPolicy), defines a security policy that will be associated with the created persistent volume claim (Line 6), in this example, policy_1. Security policies may include encryption, digital signature, access control, authentication, etc. It should be noted that using annotations for specifying a security policy is provided as an example of how a security policy can be added to a layered filesystem in an embodiment.

The yaml file creating an EXT CSI persistent volume claim also defines the data source corresponding to the EXT CSI persistent volume claim. In a sense, it makes an EXT CSI persistent volume claim to an existing persistent volume claim. In present example, this is defined through the datasource field, in the example, the data source is a persistent volume claim (Line 16) having the name nfs-test-claim. Note: this is the name for the persistent volume claim of Table 2, step 203'. Thus, the new persistent volume claim, which is an EXT CSI persistent volume claim uses as its data source the previously created persistent volume claim.

In response to receiving a persistent volume claim that has a storage class that is one of the storage classes defined to belong to the EXT CSI system (i.e., the provisioner of the storage class is EXT CSI (Line 5 of Table 4), the Kubernetes MN system 411 informs the EXT CSI driver 417 that an EXT CSI persistent volume claim has been made and the definition thereof, step 511. Every persistent volume claim requires a persistent volume. Thus, the EXT CSI driver 417 provisions a new virtual persistent volume to correspond to the received EXT CSI persistent volume claim based on the config files that defines the storage class of the received persistent volume claim (in the example, csi-test-sc) and the underlying persistent volume that the EXT CSI persistent volume claim ultimately refers back to, i.e., in the example the persistent volume defined in Step 201' named nfs-francisco, step 513.

To use the extended persistent volume claim, the name space administrator 603 of the application pod 407 that is going to make use of the extended service of the EXT CSI system adds the EXT CSI persistent volume claim to the config file for the application pod 407, step 515.

Table 6 is a YAML file illustrating how the name space administrator 603 may add the EXT CSI persistent volume claim to a pod config.

TABLE 6

| | ext-csi-demo-pod.yaml |
|---|---|
| 1 | apiVersion: v1 |
| 2 | kind: Pod |
| 3 | metadata: |
| 4 | name: ext-csi-demo |
| 5 | spec: |
| 6 | volumes: |
| 7 | - name: test-vol |
| 10 | persistentVolumeClaim: |
| 11 | claimName: ext-claim1 |
| 12 | containers: |
| 13 | - name: ubuntu |
| 14 | image: ubuntu |
| 15 | volumeMounts: |
| 16 | - mountPath: "/data" |
| 17 | name: test-vol |
| 18 | command: |
| 19 | - "sleep" |
| 20 | - "604800" |
| 21 | imagePullPolicy: IfNotPresent |
| 22 | restartPolicy: Always |

This YAML file (ext-csi-demo-pod.yaml), which, for example, the name space administrator 603 creates, configures the application pod 407 that will make use of the services of the EXT CSI system, step 515. In the pod config file, e.g., ext-csi-demo-pod.yaml, the pod is given a name, e.g., ext-csi-demo.

The config file defines the volume to use as the persistent volume claim having the claimName ext-claim1 (Line 11 of Table 6). As the ext-claim1 persistent volume claim was defined in step 509 as being an extended CSI persistent volume claim, when the pod is deployed the EXT CSI system is invoked. Ultimately this causes the security policy (policy 1 (Line 6 of Table 5)) defined for the extended CSI persistent volume claim to apply as well as the use of the persistent volume defined in step 501.

Thus, the claimName definition (Line 11) links together the pod 407, the EXT CSI storage claim, the original persistent volume claim, and the original persistent volume.

Having added the extended persistent volume claim, the namespace administrator 603 requests, via the command-line tool kubectl, that the application pod 407 be deployed, step 517, and Kubernetes MN System 411 schedules pod deployment with the Kubernetes Worker Node 403 by messaging the Kubernetes Worker Node system 410, step 518. The Kubernetes WN system 410, in turn, initiates actions necessary to deploy the application, step 519.

The pod config file defines the volumes that need to be mounted for it (Line 15-17). Thus, Kubernetes Worker-Node system 410 determines the originator of the storage class and requests the driver associated with that storage class to mount any volumes in the pod config, step 521. The driver of the storage class is not illustrated in FIG. 5.

The mechanism for mounting a volume is within the purview of the originator of a volume. Thus, if a mount is of an EXT CSI volume (as in the example of Table 6), Kubernetes WN system 410 calls on the EXT CSI Agent 423 to mount the volume. Thus, the EXT CSI Agent 423 receives the mount request to one of the volumes for which the EXT CSI system provides file services, e.g., cryptography or access control.

Contrast the YAML file demo-pod.yaml of Table 3 to the YAML file ext-csi-demo-pod.yaml of Table 5. In the former the pod accesses the nfs file storage directly. In the latter, the nfs file storage is accessed via the EXT CSI system, thus, the pod avails itself to the security policy that the EXT CSI system associates with the volume through the policy declaration in the EXT persistent volume claim.

In response to receiving a mount request to a volume belonging to one of the storage classes associated with the EXT CSI system, the EXT CSI Agent 423 creates a staging pod, i.e., it creates a pod definition for a new pod, the staging pod 613, which corresponding the extended CSI persistent volume claim, step 523 (the staging pod 613 is illustrated in dashed lines in that it does not exist prior to step 523) by sending a Kubernetes-system-internal configuration file to the Kubernetes master-node system 411, which, in turn, informs the Kubernetes worker-node system 410 of request to create the staging pod 613. The Kubernetes worker-node system 410 deploys the staging pod 613 according to the configuration provided by the Ext CSI Agent 423.

The EXT CSI Agent 423 waits for the staging pod 613 going into the running phase, step 524.

While a system internal configuration file, the configuration file for the staging pod 613 has a similar structure to a pod config file and can be exported into a YAML file for inspection. Table 7 is an example of such an export file provided to illustrate the contents of the configuration file for the staging pod 613.

TABLE 7

| | Staging Pod |
|---|---|
| 1 | kind: Pod |
| 2 | apiVersion: v1 |
| 3 | metadata: |
| 4 | name: ext-staging-podh6bj9 |
| 5 | generateName: ext-staging-pod |
| 6 | namespace: default |
| 7 | uid: 8ab1ef8a-d85f-4f03-b547-48add37b046c |
| 8 | labels: |
| 9 | ext-csi: ext-staging-pod |
| 10 | ext-volume-1: b1807209-c932-11eb-b4a1-72f29583c971 |
| 11 | selfLink: /api/v1/namespaces/default/pods/ext-staging-podh6bj9 |
| 12 | spec: |
| 13 | volumes: |
| 14 | - name: ext-staging-volume-1 |
| 15 | persistentVolumeClaim: |
| 16 | claimName: nfs-test-claim |
| 17 | name: default-token-dxh2d |
| 18 | secret: |
| 19 | secretName: default-token-dxh2d |
| 20 | defaultMode: 420 |
| 21 | containers: |
| 22 | - name: busybox |
| 23 | image: busybox |
| 24 | command: |
| 25 | - tail |
| 26 | - '-f' |
| 27 | - /dev/null |
| 28 | resources: { } |
| 29 | volumeMounts: |
| 30 | - name: ext-staging-volume-1 |
| 31 | mountPath: /ext-staging-volume-1 |
| 32 | - name: default-token-dxh2d |
| 33 | readOnly: true |
| 34 | mountPath: /var/run/secrets/kubernetes.io/serviceaccount |
| 35 | imagePullPolicy: IfNotPresent |
| 36 | restartPolicy: Always |
| 37 | terminationGracePeriodSeconds: 30 |
| 38 | nodeName: ub20-work1 |

Figure 6:
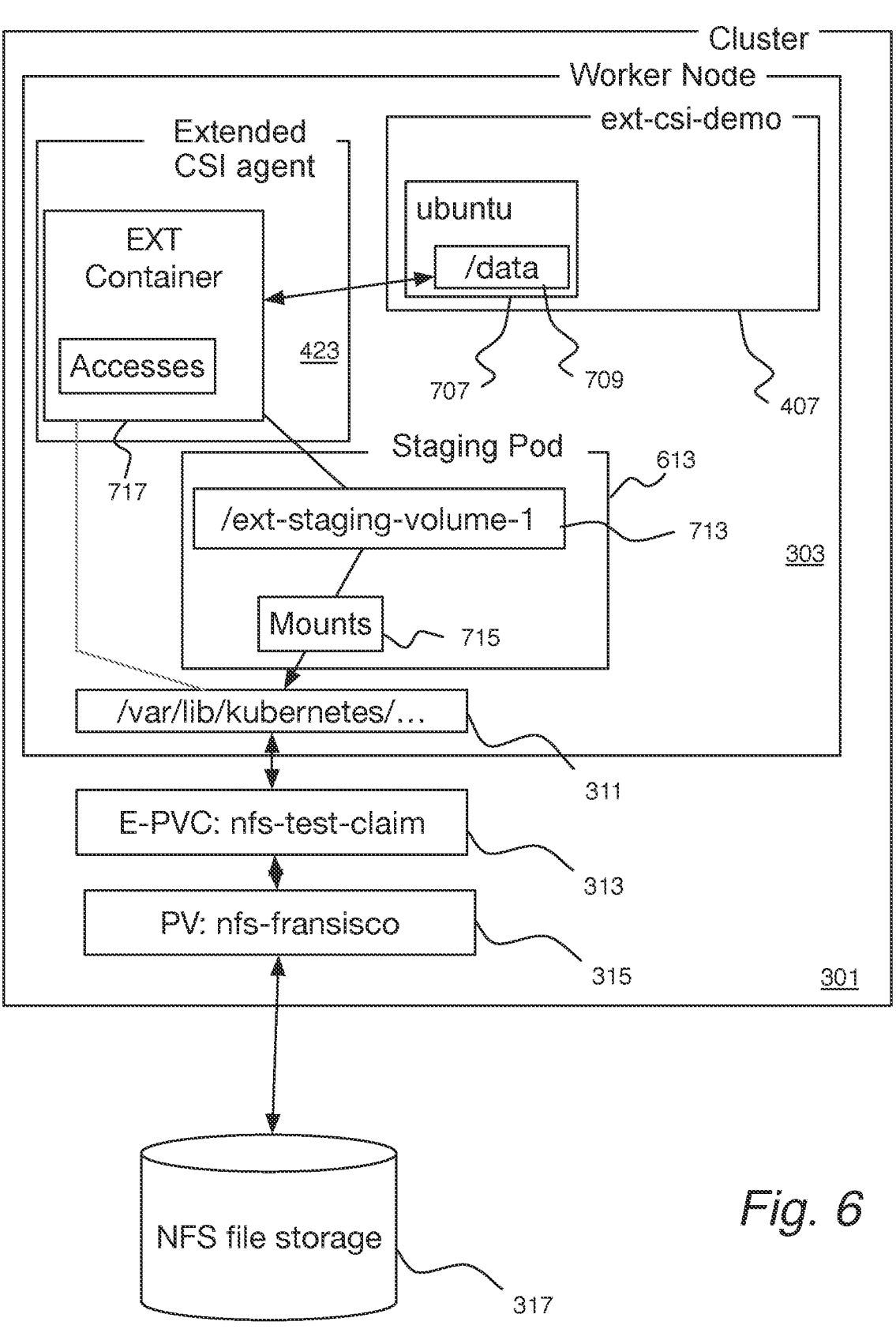
FIG. 6 is a block diagram, corresponding to FIG. 3, but illustrating the result of the flow of FIG. 5.

FIG. 6 is a block diagram, corresponding to FIG. 3, illustrating the result of the flow of FIG. 5. The request to deploy the ext-csi-demo pod has caused an instantiation of the pod 407. The pod 407 has a container 707 with a mount 709 of/data. As the Kubernetes system recognized the mount to be of an extended CSI persistent storage, the Kubernetes system messaged the EXT CSI agent 423 to alert the latter of the mount of a volume with a storage class associated to it. The Ext CSI agent 423 caused the creation of a new pod, the staging pod 613.

The persistent volume claim of the staging pod points to the original persistent volume claim (in the example, nfs-test-claim) that the extended persistent volume claim is linked to (Line 16).

Like all pods, the staging pod 613 contains a container, here staging container 713 with a mount path of /ext-staging-volume-1 pointing to the original persistent volume claim from step 203'.

In an embodiment, as illustrated in FIG. 6, while a cluster can have many nodes, the staging pod 613 is allocated by the EXT CSI agent 423 to the same worker node 303 as the application pod 407.

The staging pod contains a volume definition to the original persistent volume claim. In the example, Lines 14-16 defines the volume name ext-staging-volume-1 to be a volume on the persistent volume claim nfs-test-claim, i.e., the original persistent volume claim that is sought to be protected by the EXT CSI system.

The staging pod also contains a container, in the example referred to as busybox (Line 22), that has a volume mount on the volume ext-staging-volume-1. Therefore, the staging pod requests the driver of that volume, i.e., in the example, the nfs driver, to mount the original volume, step 525.

When the persistent volumes required by the staging pod 613 have been mounted, the staging pod 613 enters the running phase, step 535, and informs the Kubernetes system 411 and 410 of that it has entered the running phase.

Once the staging pod 613 is running, the Kubernetes system (411 and 410) inform that the Ext CSI agent 423 that the staging pod is running, step 526.

The EXT CSI Agent 423 searches the node for the mount of the original persistent volume claim, step 527. Once a staging pod 613 has been created, the EXT CSI Agent 423 has sufficient meta-data in the cluster to build a path of where the original data is located on the host.

In that endeavor, the EXT CSI Agent 423 has at its disposal some known static information:

Kubernetes Nodes Pod Staging directory (/var/lib/kube-let/pods/)

Metadata fields obtained from the cluster:

Pods Node (example: ub20-work1)

Pod UID (example: 8ab1ef8a-d85f-4f03-b547-48add37b046c)

Persistent Volume Name (example: nfs-francisco)

First, the EXT CSI agent 423 generates an initial search path:

(Kubernetes Nodes Pod Staging)+"/"+(Pod UID) "/volumes"

example: /var/lib/kubelet/pods/8ab1ef8a-d85f-4f03-b547-48add37b046c/volumes

On the node were the staging pod 613 is created, the EXT CSI Agent 423 searches for the Persistent Volume Name (nfs-francisco) on the search path. In the example, that search results in:

/var/lib/kubelet/pods/8ab1ef8a-d85f-4f03-b547-48add37b046c/volumes/kubernetes.io~nfs/nfs-francisco This path contains the mounted volume corresponding to the original persistent volume claim and onto which the filesystem layering of the EXT CSI system is to be applied. The search that the EXT CSI Agent 423 performs results in the volume path for the original persistent volume claim and the EXT CSI Agent 423 saves that path as a data source that the services of the EXT CSI system is layered on top of.

With the path to the original data, the EXT CSI Agent 423 mounts a layered file system using the original PVC mount as data source, step 529. A layer adds some additional feature to a file system, e.g., encryption services.

The mount, associated with the extended persistent volume claim determined in step 527 and mounted in step 529, is published to the containers of the application pod, step 531, by the EXT CSI Agent 423.

At this juncture of the flow of FIG. 5, the staging pod 613 and the application pod 407 are both running, step 533.

From the foregoing it will be apparent that an efficient and secure mechanism for providing transparent extension of filesystem capabilities, e.g., filesystem layering, in conjunction with container orchestration systems, e.g., Kubernetes, is provided.

Reference to Kubernetes is by way of example. The techniques described herein are applicable to other container orchestration systems, *mutatis mutandis*.

Although specific embodiments of the invention have been described and illustrated, the invention is not to be limited to the specific forms or arrangements of parts so described and illustrated. The invention is limited only by the claims.

The invention claimed is:

1. A method for extending capabilities of a filesystem in a container orchestration system without making changes to the run-time environment of the container orchestration system, wherein a filesystem extension provides a function not otherwise provided by the filesystem of the container orchestration system, the method comprising:

associating an extended storage class with an extension, whereby access to data storage volumes belonging to the extended storage class are handled by an extended file system;

associating an original volume with a storage class other than the extended storage class;

in response to deployment of an application pod configured to include a definition of an extended volume belonging to the extended storage class:

request mounting the extended volume;

creating, by the extended filesystem, a staging pod for mounting the original data storage volume and causing the container orchestration system to deploy the staging pod;

mounting, by the staging pod, the original data storage volume;

determining a path locating the mount of the original data storage volume;

using the path locating the mount of the original data storage volume, mounting the extended volume using the original data storage volume as data source, wherein the extended volume belongs to the extended storage class;

publishing the mount of the extended volume to containers of the application pod; and placing the application pod in a running phase, wherein access by the containers in the application pod to data stored in the extended volume is handled by the extended filesystem.

2. The method of extending capabilities of a filesystem in a container orchestration system of claim 1 wherein the extended capabilities is filesystem layering.

3. The method of extending capabilities of a filesystem in a container orchestration system of claim 1, wherein the extended capabilities is overlaying a first volume over a second volume to provide a cohesive volume comprising the first volume and the second volume.

4. The method for extending capabilities of a filesystem in a container orchestration system of claim 1, wherein the container orchestration system is Kubernetes.

5. The method for extending capabilities of a filesystem in a container orchestration system of claim 4, comprising the step of creating the original volume as a persistent volume and a corresponding persistent volume.

6. The method for extending capabilities of a filesystem in a container orchestration system of any of claim 4, comprising the step of creating the extended volume as a persistent volume and a corresponding persistent volume.

7. The method for extending capabilities of a filesystem in a container orchestration system of claim 1, comprising the step of creating the original volume as an ephemeral volume and a corresponding ephemeral volume.

8. The method for extending capabilities of a filesystem in a container orchestration system of claim 1, comprising the step of creating the extended volume as an ephemeral volume and a corresponding ephemeral volume.

9. The method for extending capabilities of a filesystem in a container orchestration system of claim 1, further comprising accepting the extended volume by an application container;

marshalling the access to the extended volume by the application container using a driver associated with the extended storage class.

10. The method of extending capabilities of a filesystem in a container orchestration system of claim 9, wherein the driver associated with the extended storage class provides cryptographic services on data stored in the extended volume.

11. The method of extending capabilities of a filesystem in a container orchestration system of claim 1, wherein the driver associated with the extended storage class enforces access control policies with respect to data stored in the extended volume.

12. A container orchestration system, with capability for extending the capabilities of a filesystem by providing a functional extension to an original data storage volume provided by the container orchestration systems without making changes to the run-time environment of the container orchestration system, wherein a filesystem extension provides a function not otherwise provided by the filesystem of the container orchestration system, comprising:

at least one node having a processor and a memory, the memory storing instructions to cause the processor to:

accept an association of an extended storage class with a filesystem extension, whereby access to data storage volumes belonging to the extended storage class are handled by a layered-filesystem driver of the filesystem extension;

accept an association of an original volume with a storage class other than the extended storage class;

the memory further storing an agent associated with the extended storage class, to cause the processor to:

receive a request to mount of the extended volume;

create a staging pod for mounting the original data storage volume and causing the container orchestration system to deploy the staging pod;

determine a path locating the mount of the original data storage volume; and using the path locating the mount of the original data storage volume, mounting the extended volume using the original data storage volume as data source, wherein the extended volume belongs to the extended storage class;

publishing the mount of the extended volume to containers of the application pod; and the memory further storing instructions comprising the staging pod, said instructions to cause the processor to:

mount the original data storage volume; and the memory further storing instructions to cause the processor to place the application pod in a running phase in response to the application receiving publication notification of the mount of the extended volume, wherein access by the containers in the application pod to data stored in the extended volume is handled by the driver of the extended file system.

13. The container orchestration system, with capability for extending the capabilities of a filesystem by providing a functional extension to an original data storage volume provided by the container orchestration system of claim 12, wherein the functional extension is filesystem layering.

14. The container orchestration system, with capability for extending the capabilities of a filesystem by providing a functional extension to an original data storage volume provided by the container orchestration system of claim 12, wherein the functional extension is overlaying a first volume over a second volume to provide a cohesive volume comprising the first volume and the second volume.

15. The container orchestration system, with capability for extending the capabilities of a filesystem by providing a functional extension to an original data storage volume provided by the container orchestration system of claim 12, wherein the container orchestration system is Kubernetes.

16. The container orchestration system, with capability for extending the capabilities of a filesystem by providing a functional extension to an original data storage volume provided by the container orchestration system of claim 15 wherein the original volume is a persistent volume and an associated persistent volume.

17. The container orchestration system, with capability for extending the capabilities of a filesystem by providing a functional extension to an original data storage volume provided by the container orchestration systems of claim 12, wherein the extended volume is a persistent volume and a corresponding persistent volume.

18. The container orchestration system, with capability for extending the capabilities of a filesystem by providing a functional extension to an original data storage volume provided by the container orchestration system of claim 15, wherein the original volume is an ephemeral volume and a corresponding ephemeral volume.

19. The container orchestration system, with capability for extending the capabilities of a filesystem by providing a functional extension to an original data storage volume provided by the container orchestration system of claim 15, wherein the extended volume is an ephemeral volume and a corresponding ephemeral volume.

20. The container orchestration system, with capability for extending the capabilities of a filesystem by providing a functional extension to an original data storage volume provided by the container orchestration system of claim 12, configured to marshal access to the extended volume by an application container to the driver associated with the extended storage class.

21. The container orchestration system, with capability for extending the capabilities of a filesystem by providing a functional extension to an original data storage volume provided by the container orchestration system of claim 20, wherein the driver associated with the extended storage class provides cryptographic services on data stored in the extended volume.

22. The container orchestration system, with capability for extending the capabilities of a filesystem by providing a functional extension to an original data storage volume provided by the container orchestration system of claim 20, wherein the driver associated with the extended storage class provides cryptographic services on data stored in the extended volume.

\* \* \* \* \*